United States Patent
Equiza Equiza et al.

(10) Patent No.: US 6,414,268 B1
(45) Date of Patent: Jul. 2, 2002

(54) TORCH FOR WELDING SYSTEMS IN AUTOMATIC PROCESSES

(75) Inventors: Joaquin Equiza Equiza, Pamplona; Ramón Gorriz Elia, Badostain, both of (ES)

(73) Assignee: AP Amortiguadores, S.A., Ororbia (ES)

( * ) Notice: Subject to any disclaimer, the term of this patent is extended or adjusted under 35 U.S.C. 154(b) by 0 days.

(21) Appl. No.: 09/582,320

(22) PCT Filed: Jun. 4, 1999

(86) PCT No.: PCT/ES99/00166

§ 371 (c)(1), (2), (4) Date: Jun. 23, 2000

(87) PCT Pub. No.: WO00/30796

PCT Pub. Date: Jun. 2, 2000

(30) Foreign Application Priority Data

Nov. 23, 1998 (ES) .............................................. 9802456

(51) Int. Cl.[7] .............................................. B23K 9/173
(52) U.S. Cl. .................................. 219/137.31; 219/136
(58) Field of Search .............................. 219/137.2, 136, 219/137.31, 137.62, 137.63; 901/42

(56) References Cited

U.S. PATENT DOCUMENTS

| 4,461,947 | A |   | 7/1984  | Ward |
| 5,451,117 | A | * | 9/1995  | Lajoie ........................ 901/42 |
| 5,866,874 | A | * | 2/1999  | Haczynski et al. .... 219/137.31 |
| 5,998,760 | A | * | 12/1999 | Kunz ..................... 219/137.31 |
| 6,200,519 | B1 | * | 3/2001 | Wimroither ................. 219/136 |

FOREIGN PATENT DOCUMENTS

| DE | 2528972 | 12/1976 |
| WO | 8806073 | 8/1988 |

* cited by examiner

*Primary Examiner*—Clifford C. Shaw
(74) *Attorney, Agent, or Firm*—Klauber & Jackson

(57) ABSTRACT

The support or body (23) of a welding gun is made of a material highly resistant to heat and a dielectric or insulator, as well as being resistant to impact, thereby preventing the possibility of shorting internally. The gun tube (22) is of solid copper to reduce its electrical resistance and the build-up of heat when high currents are flowing, being capable of working with currents up to 400 Amperes without cooling. Externally the body of the gun (23) is fitted with a nylon washer (20) to optimise adaptation to the supporting holder in the machine. The external cooling ducts, included on the body of the gun (23), are used to inject air to suppress the spatter (17) that could build up in the nozzle and short

3 Claims, 4 Drawing Sheets

TORCH FOR WELDING SYSTEMS IN AUTOMATIC PROCESSES

OBJECT OF THE INVENTION

The present invention, as expressed in the title of this descriptive statement refers to a torch for welding systems in automatic processes. This provides some important and advantageous characteristics in relation to those characteristics that currently exist for the same purpose and that could be considered as pertaining to its type.

Basically, welding is understood to be the union of two or more materials to achieve a single body.

There are may types of welds, but for the case in hand, we shall only mention arc welding with a filler material.

Arc welding with a filler requires strict operating conditions if the welding process is to be performed correctly. Although we are going to focus on explaining how the torch works, it is necessary to be aware of the whose process in order to understand the problems faced. As shall be seen later in relation with the figures, a typical machine incorporates the pertinent components, which are:

Rectifier unit. This produces the voltage and current necessary to fuse the wire. It is a continuous current and the negative pole is connected to the machine chassis or to the support system for the parts to be welded.

Wire feed unit or spool. This is responsible for supplying the electrode wire at a constant speed. This is important in order to guarantee the stability of the arc.

Hose. Through this element are channelled the wire, the current generated in the rectifier (positive pole) and the gas, to the welding gun.

Gas. The gas produces a neutral field or atmosphere around the welding arc. If the arc is not shielded by inert gas, then the oxygen present in the air would react with the electrode wire and with the materials to be welded, causing combustion and the end result would be porosity in the weld fillet.

Cooling unit. This is an independent cooling system composed of a motor pump, a radiator, a ventilator and a small tank of distilled water. If the welding gun requires cooling, these must also include two water tubes.

Welding torch or gun. The wire and gas come out of this element and this is where the arc is produced. Inside the gun, and to be more specific, in the tip, contact occurs between the positive pole of the rectifier unit and the wire.

The position of the gun is essential since, in order to achieve a good weld it is necessary to consider parameters such as the distance to the welding point, the angle and the capacity to resist high temperatures, as well as the correct amount of gas.

This is the element that directly supports the effects of the welding operation, such as high temperatures, spatter, knocks, etc.

Torch support. These are metallic clamps that are built into the machine chassis, they support the torch and are connected to the negative pole of the rectifier. They cannot be made of plastic since, as explained above, the position of the gun is essential, and a high degree of rigidity is required to prevent unwanted movements that could modify the points to be welded.

When the system is enabled, the gas valve located in the wire feed opens and after a certain time, the rectifier and wire feed are put into operation.

When the wire comes into contact with the part, the wire melts and an arc is produced. The wire feed unit must maintain a constant travel speed to ensure the uniformity of the arc generated. As the wire leaves the gun it is melted by the arc, depositing the molten material on the elements to be welded. The gas that also flows out of the gun, shields the arc to prevent oxygen from entering and causing material oxidation.

BACKGROUND TO THE INVENTION

In current automated systems, all the problems inherent in welding are aggravated by the fact that there are many repetitive cycles, with the subsequent non-productiveness caused by cleaning, fine tuning or break downs. This should be reduced to a minimum. Amongst these problems, the following should be highlighted:

Spatter. Once the arc has been generated, part of the molten material is projected, as droplets, due to the effect of the electromagnetic fields. These droplets are termed spatter and are projected at random, dirtying the surroundings. Many of these droplets get into the gun nozzle and end up stuck to the inside. This means that the nozzles must be cleaned frequently to permit the gas to exit correctly.

Impacts. Although, in principle the torches ought not to be knocked about, this is not so in practice. Knocks occur either because the parts are incorrectly placed in the tooling, or because the torches are mounted on height control cylinders, or also because the operator knocks them when he sees that some welding point has moved for an unknown reason. This could lead to a short circuit occurring in the gun as a result of the interior insulation breaking.

Temperature. The fact that the gun is very close to an arc directly affects its components. If the gun is not adequately cooled its conductivity will increase and this will negatively affect the current flow through the gun. This in turn increase the temperature of the gun and offers an even greater resistance to the current flow. This leads to greater energy consumption or the destruction of the gun.

Any of the above mentioned problems can cause an internal short circuit within the gun, putting it out of action.

With the general lay-out for a conventional torch, the following deficiencies occur.

The nozzle support or the gun body is metallic, bronze to be more specific, end its construction is very simple, this gives rise to continual deformations.

The gun tube is made from copper piping with an internal water cooling chamber, which means that it is not every rigid.

The insulating material between the gun tube and nozzle support is excessively thin, which means that there is very little insulation and causing short-circuiting amongst the metallic elements.

As the clamp body is made from bronze, it is susceptible to deformations and, moreover, it is oversized in comparison to the rest of the torch.

Given the fact that these elements, by their very construction, have no rigidity or heat dissipation capacity. It becomes necessary to cool them by water passing through the interior gun tube, adding yet another control parameter (levels, flow meters, thermostats, etc.).

It is not possible to attach a blower to eliminate spatter sticking to the nozzles and tips.

DESCRIPTION OF THE INVENTION

In general, the torch for welding systems in automatic processes, the object of this invention, consists of a tip where the wire comes in contact with the current, like those of the previous technique. It offers a special lay-out since it is screwed into the tip holder and this is then screwed into the gas distributor. There is also a gun hose carrying the gas, wire and power. There is a nozzle to direct the gas at the point to be welded and, similarly, the gun is connected to the hose.

The gun nozzle or body support is made of a highly heat resistant material, it is perfectly dielectric and very resistant to deformations caused by knocks and high temperatures.

The gun tube is made from solid copper. This reduces its resistively and therefore less heat is generated by the high frequency current flow. It is possible to operate with currents of up to 400 Amps without any cooling being required.

Its very structure means that no interior short circuiting is ever possible since the body of the gun itself acts as the insulator.

Thanks to the nylon washer built into the gun support or on the outside of the actual gun body, these is a better fit in the machine supporting clamp.

The cooling required with the current technique is eliminated, when working below 400 Amps, with the subsequent reduction in costs both for new equipment as well as for maintenance.

It is also possible, by eliminating an O-ring present in an annular slot in the gun tube, blocking off the gun support or gun body, and using the relative cooling conducts, to inject air through the body to eliminate spatter inside the nozzle, reducing the normal cleaning times in usual continuous automatic processes.

The invention proposes a torch that is detachable and can therefore be repaired. Moreover, it is the best option for carrying out welding work in automated processes.

To make it easier to understand the characteristics of the invention, and as an integral part of this descriptive statement, attached are some sheets of drawings. The figures in these drawings represent the following, in an illustrative and not restrictive manner:

DESCRIPTION OF PREFERRED EMBODIMENT

Figure 1:
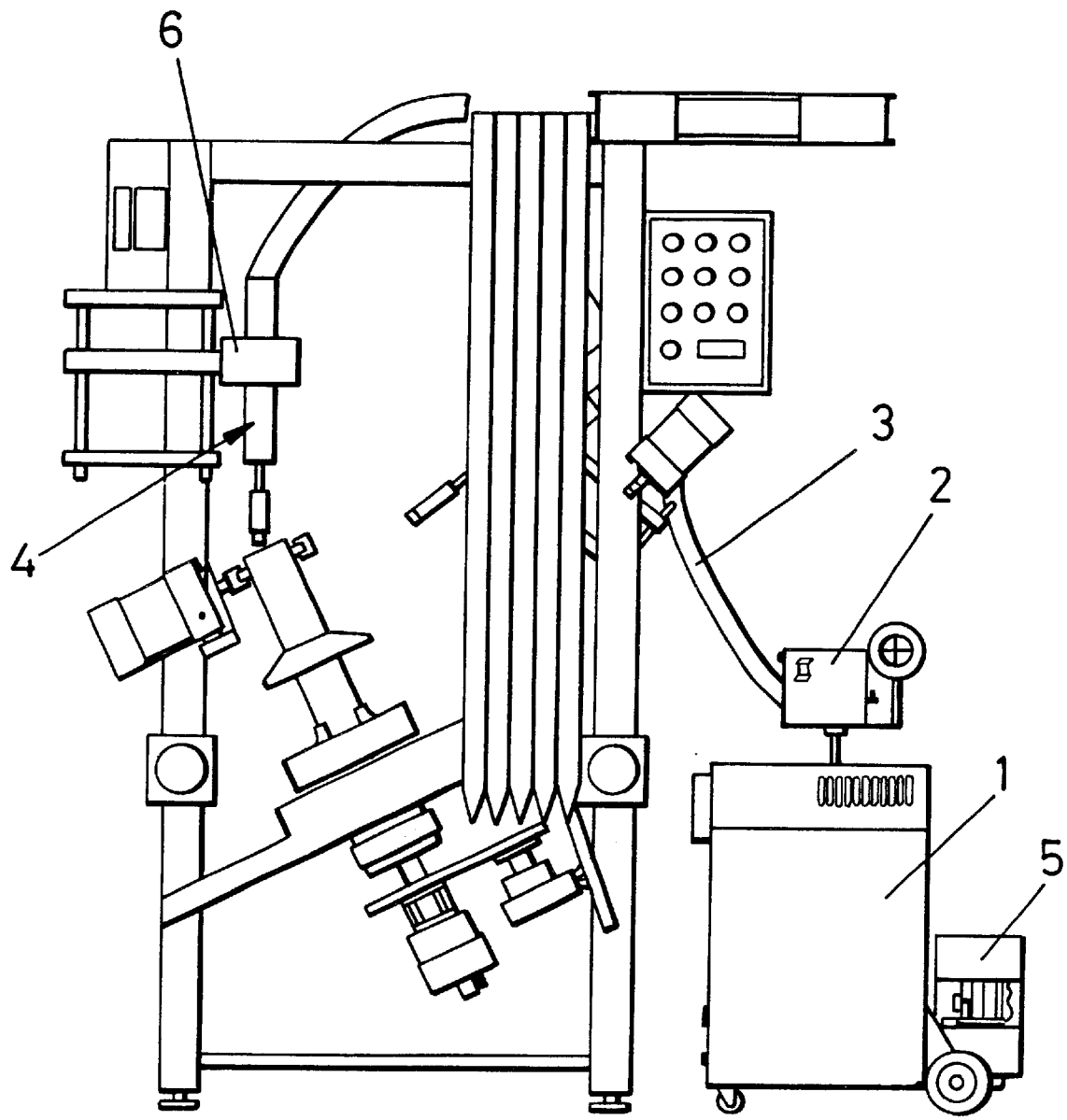
FIG. 1.—Is a diagrammatic elevation, of a typical welding machine, used in automatic processes, incorporating a welding torch or gun.

With reference to the numbering adopted in the figures, we can see the lay-out of all the components for a typical machine supporting a torch or gun for automatic processes. It consists of rectifier unit 1 that produces the voltage and current necessary to malt the wire fed at a constant speed by the wire feed unit or spool 2, which passes through hose 3 to welding torch or gun 4. The hose 3 carries the current generated by the rectifier and the neutral gas to shield the welding arc.

Reference 5 indicates the cooling unit that defines an independent cooling system. If the welding gun requires cooling, the hose must also include two water tubes.

As mentioned above, the wire and gas come out of torch 4 and this is also where the arc is produced. To be more specific, the contact of the positive pole of the rectifier group 1 with the welding wire takes place in the tip.

Torch 4 is fixed to support 6 by metallic clamps that are part of the machine chassis and are connected to the negative pole of rectifier 1.

Figure 2:
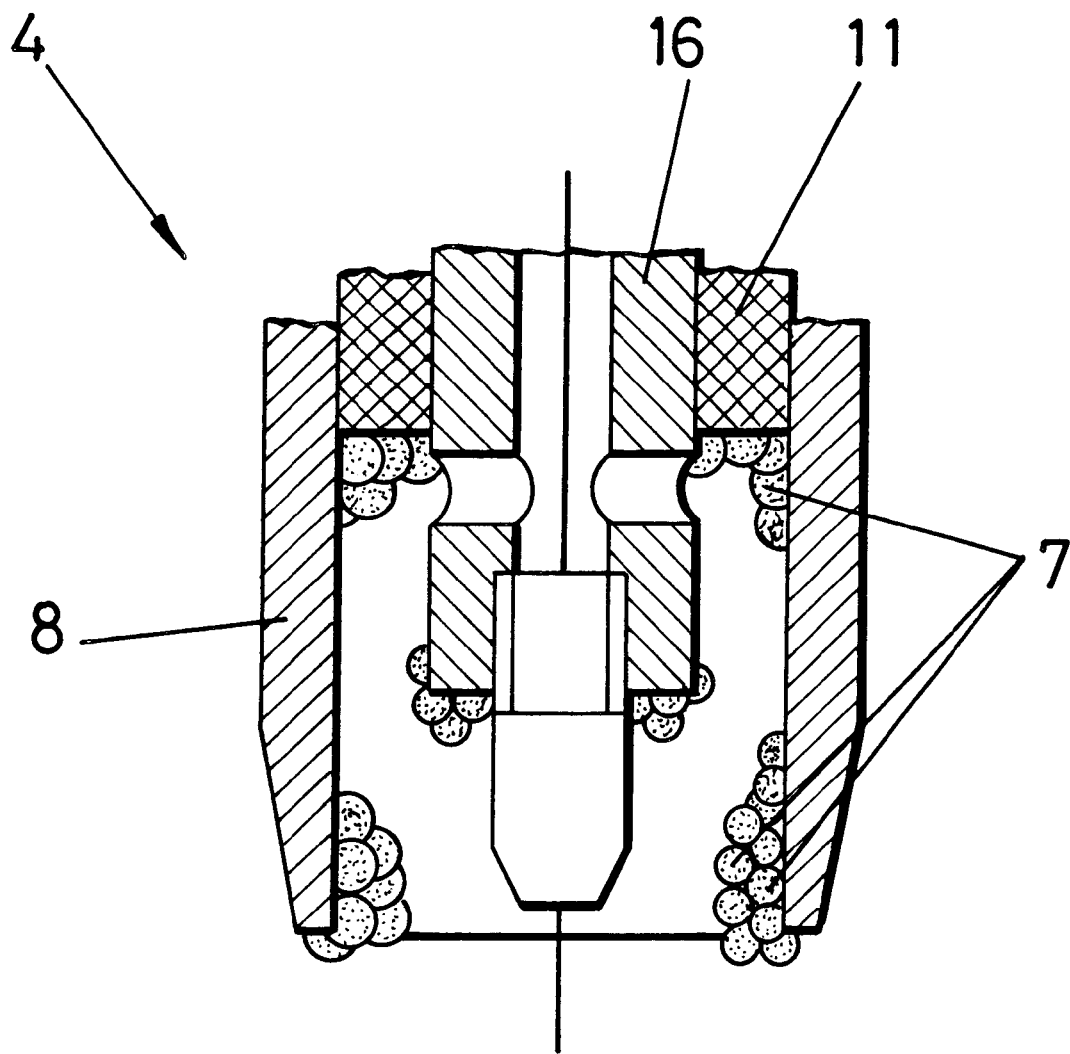
FIG. 2.—Is a cross section of the conventional welding torch or gun nozzle.

One of the problems in arc welding, mentioned at the beginning of this descriptive specification, lies in the fact that once the arc is generated, part of the molten material is projected as droplets (spatter), dirtying the surrounding area and many of these droplets get into the gun nozzle. In FIG. 2, reference number 7 shows this spatter in nozzle 8 of the gun or torch 4. This requires frequent cleaning to avoid blocking the gas exit.

Figure 3:
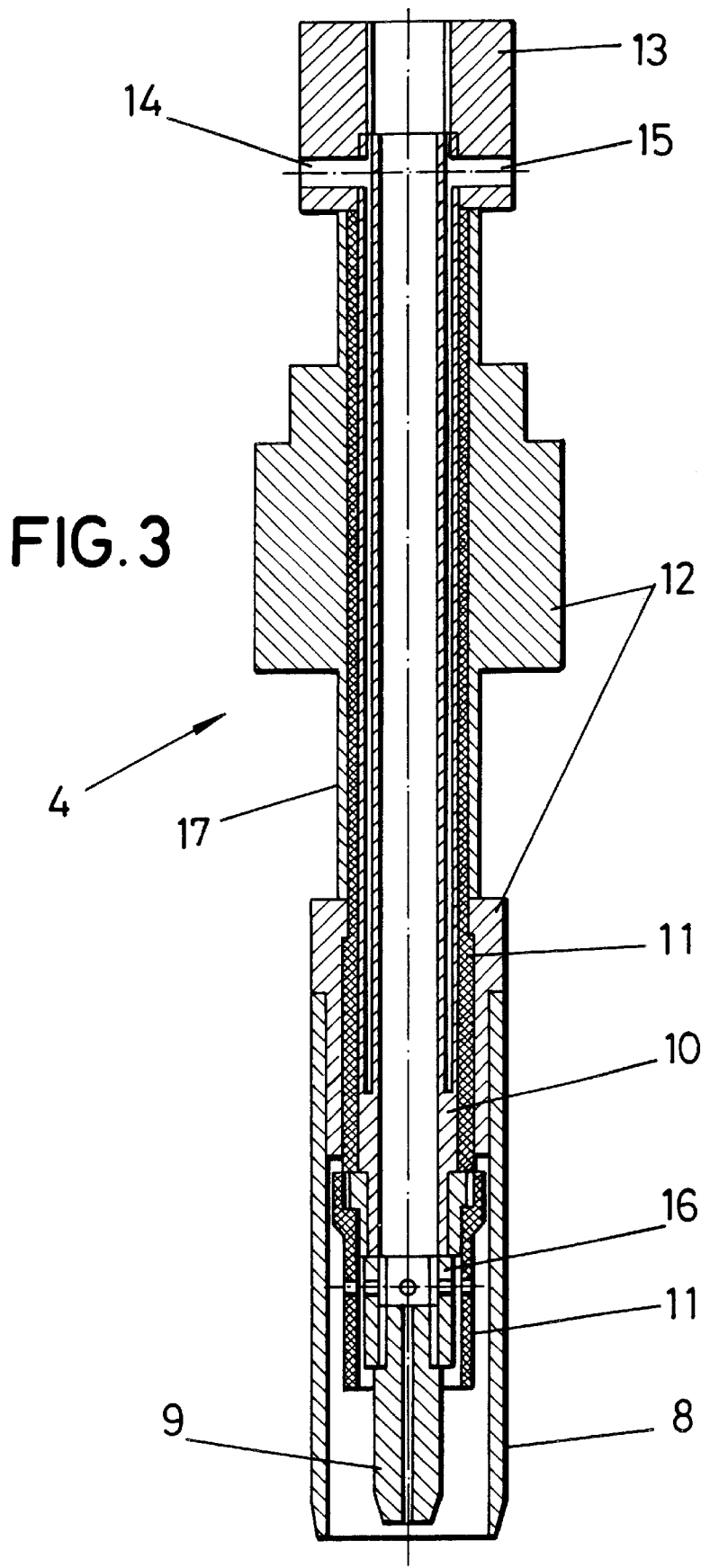
FIG. 3.—Is a longitudinal cross section of a conventional torch.

With reference to FIG. 3 now, showing a standard commercial torch, composed of a tip 9, screwed into gun tube 10, covered by nozzle 8. Reference 11 shows the insulator and reference 12 the gun body.

Connection of the torch 4 is to hose 3 is achieved by screwing into part 13 where water entry 14 is located and water outlet 15 for the cooling system.

The gas exits through the distributor ports 16.

With the layout of the conventional torch shown in FIG. 3 the contact necessary for the wire to exit with an electric current occurs at tip 9. Nozzle 8 prevents the gas from dispersing, focusing it on the arc. The gas distributor 16 has ports to enable it to exist towards nozzle 8. Gun tube 10 is connected to hose 3 through connector 13 and carries the gas, the wire and the power. Gun body 12 (made of bronze, like gun tube 10) is the point where the gun or torch 4 is fixed to machine clamp 6 (see FIG. 1). Insulator 11 prevents the current passing through gun tube 10 from passing to gun body 12 and creating a short circuit.

If we go back to FIG. 2, we can observe that the spatter accumulated 7, as well as preventing the gas from exiting correctly, builds up on insulator 11, in such a way to short circuit the gun tip and body.

In these conditions, the electric current no longer flows from the tip, wire, part to be welded, chassis. Instead, it flows from the tip, spatter, gun body, gun clamp and chassis; but from the nozzle, spatter, gun body, gun clamp and chassis. We are thus faced with a shorted gun. Generally the insulator cannot be recovered and the gun can no longer be user.

Moreover, the central section of the welding torch or gun 4, with reference number 17, can be subject to knocks, breaking the interior insulation and causing the gun to short circuit. In this case the electric current would pass directly from the gun tube 10 to the gun body 12, and then on to the machine chassis.

Figure 4:
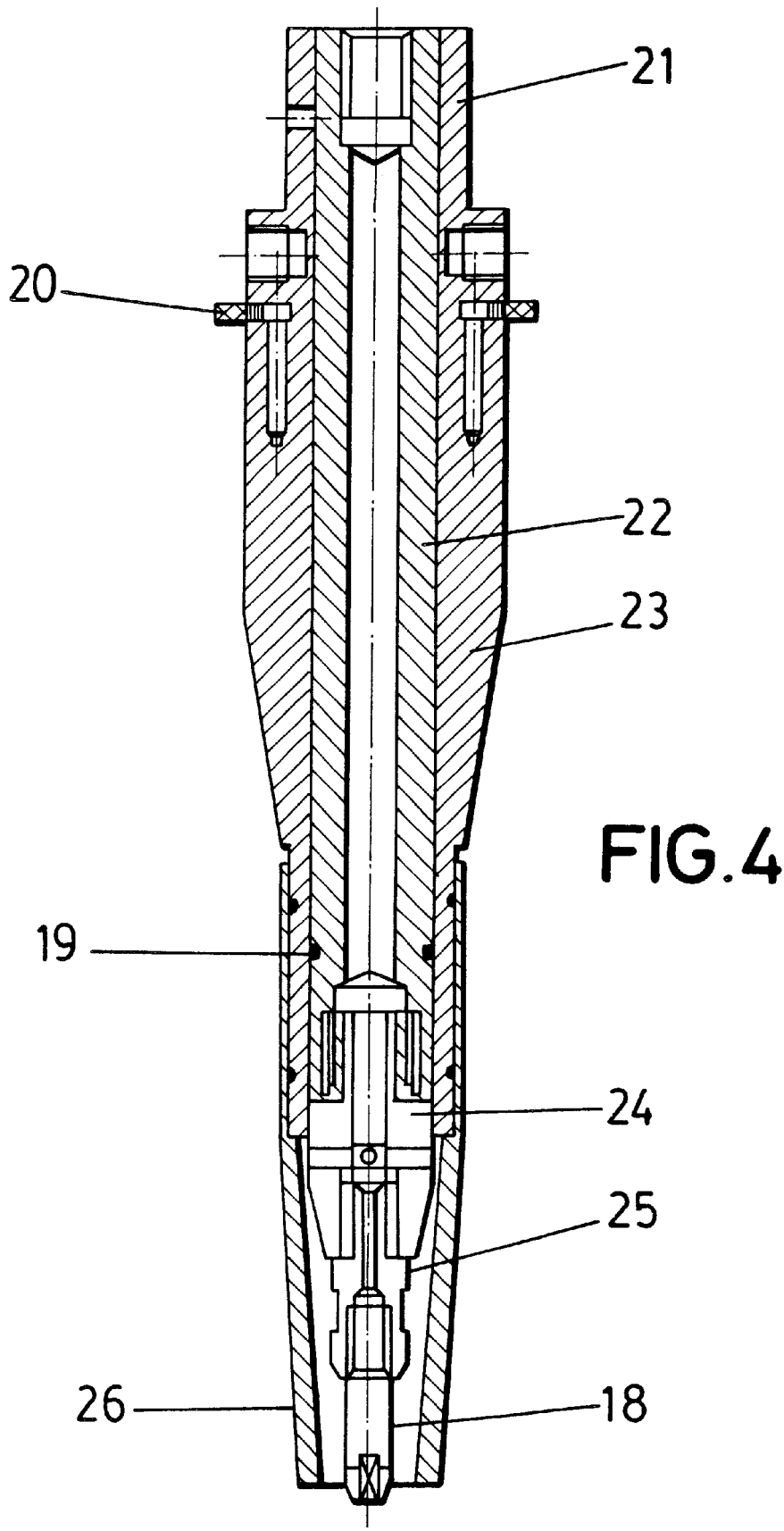
FIG. 4.—Is a longitudinal cross section of a torch for welding systems in automatic processes, according to the invention.

FIG. 4 shows a longitudinal section for a torch for welding systems in automatic processes, as contemplated by the present invention, and is composed of the following elements:

18.-Tip.
19.-O-ring.
20.-Nylon washer.
21.-Gun connection.
22.-Gun tube.
23.-Gun support or body.
24.-Gas distributor.
25.-Tip holder.
26.-Nozzle.

As in the case commented in relation to FIG. 3 of the conventional welding torch or gun, at tip 18 the wire makes contact with the current. Tip 18 is screwed into tip holder 25 which is then screwed into gas distributor 24. There is a gun tube 22 also carries the gas, wire and power. Nozzle 26 focuses the gas on the welding point, and the torch is connected to the hose through connection 21.

The lay-out shown in FIG. 4 offers the following advantages with regard to those presented by the conventional gun of FIG. 3:

1. The gun support or gun body 23, is made from a material that is highly heat resistant, as well as also being perfectly dielectric and very resistant to deformation caused by knocks and high temperatures.
2. The gun tube 22 is made from solid copper, reducing its resistivity and therefore the heat generation from the high currents passing through it. As mentioned previously, it is possible to work with currents of up to 400 Amperes without cooling.
3. Internal short circuiting is not possible since the actual gun body 23 is the insulator.
4. Thanks to the nylon washer 20, there is a better fit in the machine support clamp 6 (see FIG. 1).
5. Cost reduction, by eliminating cooling requirements if operating below 400 Amps.
6. By removing the O-ring 19 and using the cooling ducts, air can be injected into the nozzle and tip to remove spatter 7 (see FIG. 2), reducing cleaning time in continuous automatic processes.
7. It can be completely dismantled to enable it to be repaired.

What is claimed is:

1. In a torch for an automatic welding process in which a welding machine comprises a chassis including metallic clamps for supporting the torch and provides electrical connection with a rectifier unit, and the automatic welding process feeds a wire for arc welding with filler material and shields a welding arc from the torch by providing a neutral gas, wherein the improvement comprises:

the torch comprises:

a tip holder at least partially housed within a nozzle;

a gas distributor in communication with the tip holder;

a gun body comprising a dielectric material resistant to heat and knocks;

a gun tube comprising copper arranged within the gun body;

a nylon washer extending from the gun body for optimizing a fit of the torch with the metallic clamps of the welding machine; and wherein an auxiliary cooling unit is not required when the torch below 400 Amps.

2. The torch according to claim 1, wherein the gun body includes exterior cooling ducts, and an O-ring is arranged between the gun tube and the gun body, so that the exterior cooling ducts permit elimination of spatter in an inner area of the nozzle only when the O-ring is removed.

3. The torch according to claim 1, wherein at least a portion of the nylon washer is housed in the gun body.

* * * * *